US011252257B2

(12) United States Patent
Syckel et al.

(10) Patent No.: US 11,252,257 B2
(45) Date of Patent: Feb. 15, 2022

(54) DYNAMIC REST ACCESS

(71) Applicant: SAP SE, Walldorf (DE)

(72) Inventors: Sebastian Van Syckel, Mannheim (DE); Tim Philipp Trabold, Reilingen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/811,679

(22) Filed: Mar. 6, 2020

(65) Prior Publication Data
US 2021/0281659 A1 Sep. 9, 2021

(51) Int. Cl.
G06F 16/25 (2019.01)
H04L 29/08 (2006.01)
G06F 16/21 (2019.01)
G06F 16/242 (2019.01)

(52) U.S. Cl.
CPC ............ H04L 67/32 (2013.01); G06F 16/212 (2019.01); G06F 16/242 (2019.01); G06F 16/256 (2019.01); H04L 67/02 (2013.01)

(58) Field of Classification Search
None
See application file for complete search history.

(56) References Cited

U.S. PATENT DOCUMENTS

| 2006/0029076 | A1* | 2/2006 | Namihira | H04L 29/1233 370/392 |
| 2014/0019473 | A1* | 1/2014 | Kamenz | G06F 16/212 707/769 |
| 2015/0006346 | A1* | 1/2015 | Amancherla | G06Q 40/02 705/35 |
| 2016/0162305 | A1* | 6/2016 | Kotecha | G06F 9/44505 717/121 |
| 2017/0031983 | A1* | 2/2017 | Sarferaz | G06F 16/24535 |
| 2017/0060878 | A1* | 3/2017 | Demant | G06F 16/252 |
| 2017/0329580 | A1* | 11/2017 | Jann | G06F 8/35 |
| 2017/0329581 | A1* | 11/2017 | Jann | G06F 8/38 |
| 2018/0349453 | A1* | 12/2018 | Khatri | G06F 16/2282 |
| 2018/0357273 | A1* | 12/2018 | Srivastava | G06F 16/2448 |
| 2019/0188297 | A1* | 6/2019 | Goyal | G06F 40/169 |
| 2019/0370375 | A1* | 12/2019 | Wachs | G06F 16/248 |
| 2020/0004848 | A1* | 1/2020 | Wood | G06F 16/289 |

OTHER PUBLICATIONS

Analytics Annotations, SAP Help Portal https://help.sap.com/viewer/cc0c305d2fab47bd808adcad3ca7ee9d/7.5.9/en-US/c2dd92fb83784c4a87e16e66abeeacbd.html, at least as early as Mar. 6, 2020, 6 pages.

(Continued)

Primary Examiner — Joshua Joo
(74) Attorney, Agent, or Firm — Klarquist Sparkman, LLP

(57) ABSTRACT

Techniques and solutions are described for providing access to data using web services, such as OData services. OData services can be dynamically added to a routing table used by a router. The router can be statically registered with an application instance, such as a server associated with the application instance. A web service can be generated from a definition of a data artefact, such as a table or view, stored in a database. A virtual data artefact corresponding to the data artefact can be generated, and used to generate the web service. A message service can cause web services to be generated when a data artefact is added or changed.

20 Claims, 12 Drawing Sheets

(56) References Cited

OTHER PUBLICATIONS

Rittman, Understanding the Role of the OLAP Catalog, rittmanmead, https://www.rittmanmead.com/blog/2004/11/understanding-the-role-of-the-olap-catalog/, Nov. 29, 2004, 7 pages.
Oracle® OLAP, https://docs.oracle.com/cd/B13789_01/olap.101/b10333.pdf, Dec. 2003, 414 pages.
Ender, "Taking your SAS/MDBB® Server Applications to the Next Level," https://www.researchgate.net/publication/228722211_Taking_Your_SASMDDBR_Server_Applications_to_the_Next_Level, at least as early as Mar. 6, 2020, 14 pages.
UI Technology Guide for SAP S/4HANA 1709 https://manualzz.com/doc/45329726/ui-technology-guide-for-sap-s-4hana-1709, Sep. 15, 2017, 96 pages.
Configuring SAP Web Dispatcher, SAP Help Portal, https://help.sap.com/viewer/a7b390faab1140c087b8926571e942b7/201809.002/en-US/a3d329d2a7d94293bb2fl e2f5ae5df5b.html, at least as early as Mar. 6, 2020, 2 pages.
Defloo, "SAP Web Dispatcher for Fiori explained. Why and how?" https://blogs.sap.com/2016/12/06/sap-web-dispatcher-for-fiori-explained.-why-and-how/, Dec. 6, 2015, 1 page.
Routing, https://expressjs.com/en/guide/routing.html, at least as early as Mar. 6, 2020, 8 pages.
Query Modeler Dynamic OData Services, https://help.sap.com/viewer/080fabc6cae6423fb45fca7752adb61e/1906a/en-US/5c5e1905225e402e8912feb7b773c616.html, at least as early as Mar. 6, 2020, 4 pages.
Configuration: OData Service, https://help.sap.com/viewer/fffd6ca18e374c2e80688dab5c31527f/1912a/en-US/9e4c4b5ddf4e4f6faf00a3344519f437.html, at least as early as Mar. 6, 2020, 8 pages.
Behrens, Start migrating_now_from REST-based thing models to OData-based thing models, https://blogs.sap.com/2019/03/26/start-migrating-_now_-from-odata-based-thing-models-to-rest-based-thing-models/, Mar. 26, 2019, 1 page.
Retrieve the Metadata of the Service, https://help.sap.com/viewer/080fabc6cae6423fb45fca7752adb61e/1910b/en-US/a3e5dc6b0c7b481eaa70bcb313d5176d.html, at least as early as Mar. 6, 2020, 3 pages.
Setting up the Data Persistence Model in SAP HANA, https://help.sap.com/viewer/52715f71adba4aaeb480d946c742d1f6/2.0.04/en-US/cf5651bde44d4c8796874182fdc8cdeb.html, at least as early as Mar. 6, 2020, 10 pages.
Creating the Persistence Model in Core Data Services, https://help.sap.com/viewer/b3d0daf2a98e49ada00bf31b7ca7a42e/2.0.03/en-US/b523afd66f5a40469573d9c47d7af831.html, at least as early as Mar. 6, 2020, 2 pages.
Creating your first very simple OData SAP Gateway Service, trailsap.com, https://www.trailsap.com/dev/sap-webapps/?topic=segw-odata-gateway-service, at least as early as Mar. 6, 2020, 11 pages.
Zwickel, Join cardinality setting in Calculation Views, https://blogs.sap.com/2017/10/27/join-cardinality-setting-in-calculation-views/, Oct. 27, 2017, 1 page.
Dasari, SAP NW Gateway Odata Service, from SAP ABAP CDS View, https://www.slideshare.net/AnilDasari6/odata-service-from-abap-cds, at least as early as Mar. 6, 2020, 11 pages.
Schema Notation (CSN) Core Data Services, https://cap.cloud.sap/docs/cds/csn, at least as early as Mar. 6, 2020, 30 pages.
ConSolut Solutions+Value, https://consolut.com/supportportal/sap-online-help/sap-documentation/documentation-view/?article=yd-scdm_common_data_model, at least as early as Mar. 6, 2020, 4 pages.
Elmasri et al., Fundamentals of Database Systems, (7$^{th}$ Edition), Pearson, Chapter 2: Database System Concepts and Architecture, https://cezeife.myweb.cs.uwindsor.ca/courses/60-315/notes/ch2_4slides.pdf, Aug. 29, 2019, 7 pages.
Query Modeler Dynamic OData Services, https://help.sap.com/viewer/8bd6c3b22c0e439bada8f777b7c51a8a/1905a/en-US, at least as early as Mar. 6, 2020, 4 pages.
Roggan, "SAP Cloud Platform Backend service: Tutorial [12]: CDS local: build," https://blogs.sap.com/2019/04/15/sap-cloud-platform-backend-service-tutorial-12-cds-local-build/, Apr. 15, 2019, 17 pages.
Hofmann, Create on oData Service from CDS, https://www.itsfullofstars.de/2019/11/create-an-odata-service-from-cds/, Nov. 6, 2019, 29 pages.
Expose CDS View as an OData Service, https://help.sap.com/viewer/cc0c305d2fab47bd808adcad3ca7ee9d/7.5.9/en-US/79cb3bf4eafd4af9b39bc6842e5be8bd.html, at least as early as Mar. 6, 2020, 2 pages.
Sawasta, CDS Part 3. Expose CDS Views as OData Service through Annotation, https://sapyard.com/abap-on-sap-hana-part-xv-expose-cds-views-as-odata-service-through-annotation/, May 23, 2017, 11 pages.
DJ Adams, "Define a Simple Data Model and OData Service with CDS," https://developers.sap.com/tutorials/odata-05-data-model-service.html, Sep. 14, 2018, 23 pages.
DJ Adams, "Add Data to your OData Service," https://developers.sap.com/tutorials/odata-06-add-data-odata-service.html, Sep. 14, 2018, 14 pages.
Singh, "Exploring/Understanding Gateway Service Builder (SEGW)," https://blogs.sap.com/2019/05/14/exploringunderstanding-segw/, May 14, 2019.
Thing Type Category, https://help.sap.com/viewer/fffd6ca18e374c2e80688dab5c31527f/1912a/en-US/3f6d09a9a9324f0db3e53f4a6e786e38.html, at least as early as Mar. 6, 2020, 1 page.
Overview (OData Version 2.0), https://www.odata.org/documentation/odata-version-2-0/overview/, at least as early as Mar. 6, 2020, 9 pages.
Verify that OData Services are Active, SAP Help Portal, https://help.sap.com/viewer/5f6a0c50ac324b0395738c1ce0fe14c6/4.0.1/en-US/4a388f53e2039456e10000000423f68.html, at least as early as Mar. 6, 2020, 9 pages.
Add Start Authorizations for OData Services to Role on Front End, SAP Documentation, https://help.sap.com/saphelp_fiorierpx1_100/helpdata/en/cd/284353d5da6957e10000000a44538d/frameset.htm, at least as early as Mar. 6, 2020, 2 pages.
Gupta, "How to create ABAP CDS view and OData with SAP Annotations," https://blogs.sap.com/2016/10/13/create-abap-cds-view-odata-sap-annotations/, Oct. 13, 2016, 8 pages.
Getting Started in a Nutshell Using a minimalistic setup, https://cap.cloud.sap/docs/get-started/in-a-nutshell, at least as early as Mar. 6, 2020, 22 pages.
How to Develop a Simple Backend Extension Application for Sap S/4HANA Cloud, https://blog.sap-press.com/how-to-develop-a-simple-backend-extension-application-for-sap-s/4hana-cloud, Oct. 18, 2019, 13 pages.
Working with UI Annotations, https://sapui5.hana.ondemand.com/sdk/#/topic/83c89ccef12f48ab98f6c3811bd025b3 , at least as Early as Mar. 6, 2020, 3 pages.
Assigning an Authorized Role Collection, https://help.sap.com/viewer/b15d2f41b2ab45bcb0de23835b15d598/1904a/en-US/708449095483419586514cb61fa432f5.html, at least as early as Mar. 6, 2020, 2 pages.
Tiwari, "Introduction to Annotation Tags and Properties," https://blogs.sap.com/2019/02/25/introduction-to-annotation-tags/, Feb. 25, 2019, 9 pages.
Difference between entity type and entity set, database—Difference between entity type and entity set?—Stack Overflow, at least as early as Mar. 6, 2020, 3 pages.
Basic routing, https://expressjs.com/en/starter/basic-routing.html, at least as early as Mar. 6, 2020, 2 pages.
Halliday, "How to Define Routes and HTTP Request Methods in Express," https://www.digitalocean.com/community/tutorials/nodejs-express-routing, Mar. 14, 2019, 14 pages.
OData routing in Web Api, https://stackoverflow.com/questions/31985730/odata-routing-in-web-api, at least as early as Mar. 6, 2020, 2 pages.
Leinonen, "asp.net Core OData and custom routing," http://www.dehavior.com/blog/aspnet-core-odata-and-custom-routing/, Mar. 6, 2018, 13 pages.

(56) References Cited

OTHER PUBLICATIONS

Introduction Routing, https://docs.microsoft.com/en-us/odata/webapi/routing-abstract, Jul. 1, 2019, 3 pages.
Built-in routing conventions, https://docs.microsoft.com/en-us/odata/webapi/built-in-routing-conventions, Jul. 1, 2019, 7 pages.
Configuration: MetaData Objects, https://help.sap.com/viewer/fffd6ca18e374c2e80688dab5c31527f/1912a/en-US/a40b9eddf9d949bca580c185532fa441.html, at least as early as Mar. 6, 2020, 6 pages.
Configuration: OData Service, https://help.sap.com/viewer/fffd6ca18e374c2e80688dab5c31527f/1912a/en-US/9e4c4b5ddf4e4f6faf00a3344519f437.html, at least as early as Mar. 6, 2020, 6 pages.

\* cited by examiner

```
namespace sap.iot.qm.gen.ACME_MyQueryModel;

context Entities { entity Facts {            ⟵604
      key ThingID: String(256);    ⟵608
612 key PointInTime: Timestamp;
      FillLevel_Avg: Double;    ⟵616
      Temperature_Min: Double;
      Temperature_Max: Double;
    }                              ⟵618 entity ThingDimension {    622
      key ThingID: String(256);            634
626 @PersonalData.IsPotentiallyPersonal
      Location: String;                  ⟵634
      @PersonalData.IsPotentiallySensitive
      Date: Date;
    }       ⟵630

} service Dynamic {    ⟵640
644
      @Capabilities.InsertRestrictions.Insertable: false
      @Capabilities.UpdateRestrictions.Updatable: false
648 entity Facts as projection on Entities.Facts;

644
      @Capabilities.InsertRestrictions.Insertable: false
      @Capabilities.UpdateRestrictions.Updatable: false
648 entity Things as projection on Entities.ThingDimension;

```xml
<?xml version="1.0" encoding="utf-8"?>
<edmx:Edmx Version="4.0" xmlns:edmx="http://docs.oasis-open.org/odata/ns/edmx">
  <edmx:Reference Uri="https://oasis-tcs.github.io/odata-vocabularies/vocabularies/Org.OData.Capabilities.V1.xml">
    <edmx:Include Alias="Capabilities" Namespace="Org.OData.Capabilities.V1"/>
  </edmx:Reference>
  <edmx:Reference Uri="https://oasis-tcs.github.io/odata-vocabularies/vocabularies/Org.OData.Core.V1.xml">        700
    <edmx:Include Alias="Core" Namespace="Org.OData.Core.V1"/>
  </edmx:Reference>
  <edmx:Reference Uri="https://sap.github.io/odata-vocabularies/vocabularies/PersonalData.xml">
    <edmx:Include Alias="PersonalData" Namespace="com.sap.vocabularies.PersonalData.v1"/>
  </edmx:Reference>
  <edmx:DataServices>
    <Schema Namespace="sap.iot.qm.gen.ACME_MyQueryModel.Dynamic" xmlns="http://docs.oasis-open.org/odata/ns/edm">
      <EntityContainer Name="EntityContainer">                                                        714
        <EntitySet Name="Facts" EntityType="sap.iot.qm.gen.ACME_MyQueryModel.Dynamic.Facts"/>
710     <EntitySet Name="Things" EntityType="sap.iot.qm.gen.ACME_MyQueryModel.Dynamic.Things"/>
      </EntityContainer>                                                                              718
      <EntityType Name="Facts">
        <Key>                          722
          <PropertyRef Name="ThingID"/>
          <PropertyRef Name="PointInTime"/>              718
        </Key>                     722
        <Property Name="ThingID" Type="Edm.String" MaxLength="256" Nullable="false"/>    728
        <Property Name="PointInTime" Type="Edm.DateTimeOffset" Precision="7" Nullable="false"/>
        <Property Name="FillLevel_Avg" Type="Edm.Double"/>        728
728     <Property Name="Temperature_Min" Type="Edm.Double"/>
        <Property Name="Temperature_Max" Type="Edm.Double"/>
      </EntityType>                                             728
      <EntityType Name="Things">
        <Key>          718    724
          <PropertyRef Name="ThingID"/>
        </Key>                                                  730
730     <Property Name="ThingID" Type="Edm.String" MaxLength="256" Nullable="false"/>
        <Property Name="Location" Type="Edm.String"/>
        <Property Name="Date" Type="Edm.Date"/>
      </EntityType>                       730
      <Annotations Target="sap.iot.qm.gen.ACME_MyQueryModel.Dynamic.EntityContainer/Facts">
        <Annotation Term="Capabilities.InsertRestrictions">
          <Record Type="Capabilities.InsertRestrictionsType">
            <PropertyValue Property="Insertable" Bool="false"/>  740
          </Record>
        </Annotation>
        <Annotation Term="Capabilities.UpdateRestrictions">      744
          <Record Type="Capabilities.UpdateRestrictionsType">
            <PropertyValue Property="Updatable" Bool="false"/>
          </Record>
        </Annotation>
      </Annotations>
      <Annotations Target="sap.iot.qm.gen.ACME_MyQueryModel.Dynamic.EntityContainer/Things">
        <Annotation Term="Capabilities.InsertRestrictions">
          <Record Type="Capabilities.InsertRestrictionsType">
            <PropertyValue Property="Insertable" Bool="false"/>  740
          </Record>
        </Annotation>
        <Annotation Term="Capabilities.UpdateRestrictions">      744
          <Record Type="Capabilities.UpdateRestrictionsType">
            <PropertyValue Property="Updatable" Bool="false"/>
          </Record>
        </Annotation>                                                760
      </Annotations>
      <Annotations Target="sap.iot.qm.gen.ACME_MyQueryModel.Dynamic.Things/Location">
        <Annotation Term="PersonalData.IsPotentiallyPersonal" Bool="true"/>
      </Annotations>
      <Annotations Target="sap.iot.qm.gen.ACME_MyQueryModel.Dynamic.Things/Date">
        <Annotation Term="PersonalData.IsPotentiallySensitive" Bool="true"/>
      </Annotations>                                             760
    </Schema>
  </edmx:DataServices>
</edmx:Edmx>
```

FIG. 7

Dynamic OData Service API:

base path:
- /odata/v4/<identity zone>/<query model id>/v1 ⟵ 910
- example: /odata/v4/ACME/MyQueryModel/v1 ⟵ 912 example OData requests:
- get metadata: GET /odata/v4/<identity zone>/<query model id>/v1 ⟵ 920
  - example: metadata.xml attachment
- read facts (i.e., "aggregates"):
- GET /odata/v4/<identity zone>/<query model id>/v1/Facts ⟵ 922
- example response:
  [
    {
      "ThingID": "Thing_1", ⟵ 926
      "PointInTime": "2020-01-01T12:00:00.000Z",
      "FillLevel_Avg": "12.3",
      "Temperature_Min": "17.1",
      "Temperature_Max": "32.4"
    },
    ...
  ]

930 ⟶ additional, i.e., non standard OData endpoints:
- GET /odata/v4/$list:
  - returns the tenant-specific list of dynamic odata services
  - example response:
    {
      "MyQueryModel": "/odata/v4/ACME/MyQueryModel/v1" ⟵ 932
    }
- POST /odata/v4/$sync: ⟵ 940
  - triggers manual refresh of the dynamic odata services for identity zone in the JWT at all app instances
  - only needed in case of errors, etc.

950 ⟶ - GET /odata/v4/<identity zone>/<query model id>/v1/$personal:
  - returns the list of personal and sensitive personal dimensions for the respective query model
  - example path: /odata/v4/ACME/MyQueryModel/v1/$personal ⟵ 952
  - example response:
    {
      "@PersonalData": ["Date"],
      "@SensitivePersonalData": ["Location"] ⟵ 956
    }

FIG. 9

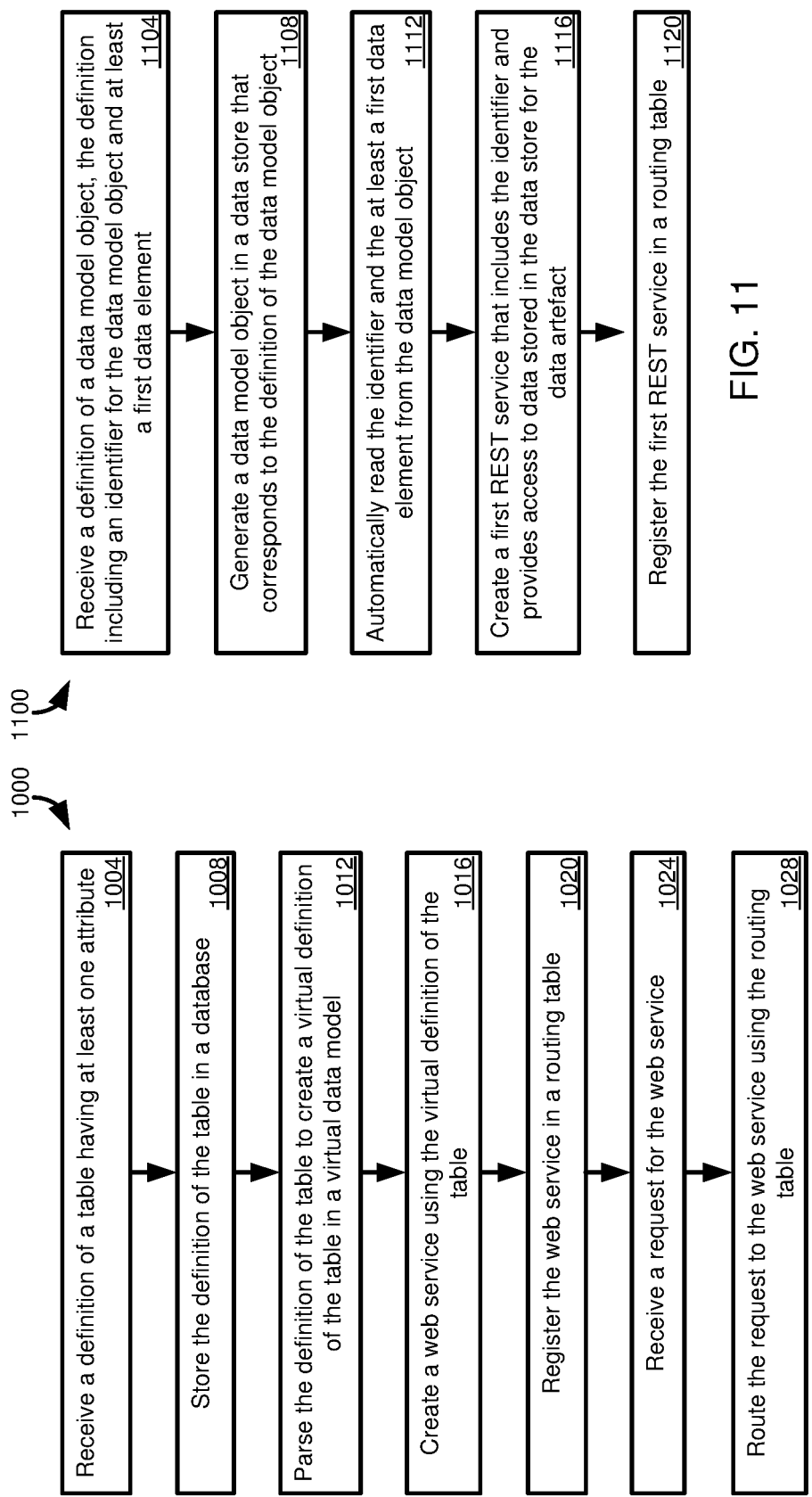

DYNAMIC REST ACCESS

FIELD

The present disclosure generally relates to providing access to data using web services. Particular examples provide for creating web services during application runtime and dynamically making such services available.

BACKGROUND

It is increasingly common to use web-based technologies, including for performing functions that might have previously been carried out on a local computing device or system. In some cases, using web-based technologies to access resources on a remote computing system can allow users to access specialized applications or greater computing resources associated with the remote computing system. For example, a remote computing system may provide machine learning functionality, including for Internet of things (IOT) applications.

IOT applications can involve massive amounts of data (e.g., generated from hundreds or thousands of sensors or other types of IOT devices), and techniques to analyze the data can be computationally expensive. A remote computing system, such as a cloud-based system, can make larger amounts of memory (e.g., RAM), secondary storage (disk space), and processing power (e.g., a GPU cluster) available to users over a network, including the Internet.

Accessing remote resources can also be desirable because it can be more cost effective than maintaining a local system. For example, having a cloud provider handle infrastructure issues, such as making sure suitable hardware is available, can allow users greater flexibility, as they can scale up and scale down their use of cloud services as needed. Having a provider maintain and configure software can reduce costs for users, since they can maintain a smaller number of qualified personnel, and obtaining software as a service from a vendor can improve performance and availability, as the vendor may be better able to update and configure the software.

Certain types of technologies are easier to make available as cloud based services, or otherwise on a remote basis, than others. Software, particularly complex enterprise applications, may not have been written with web-based access or other types of remote access in mind. In particular, components of a database system may rely on legacy technology. Given the number of systems that often rely on a database system, and the complexity of the associated database management system, it may be impractical to update or replace the database management system with support for remote access/cloud-based systems. Accordingly, adapting software to support remote access, and particularly for new use cases, can be challenging, and room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for providing access to data using web services, such as OData services. OData services can be dynamically added to a routing table used by a router. The router can be statically registered with an application instance, such as a server associated with the application instance. A web service can be generated from a definition of a data artefact, such as a table or view, stored in a database. A virtual data artefact corresponding to the data artefact can be generated, and used to generate the web service. A message service can cause web services to be generated when a data artefact is added or changed.

A method is provided for servicing data requests using a web service that is dynamically created and made available during the runtime of an application instance. A definition of a table is received. The table includes at least one attribute. The definition of the table is stored in a database. The definition is parsed to create a virtual definition of the table in a virtual data model. A web service is created using the virtual definition of the table. The web service is registered in a routing table (e.g., a service map). A request for the web service is received. The request is routed to the web service using the routing table.

According to an additional aspect, a method is provided for creating and making available a REST service. A definition of a data model object is received. The definition includes an identifier for the data model object and at least a first data element. A data model object is generated in a data store. The data model object corresponds to the definition of the data model object. The identifier and the at least a first data element from the data model object are automatically read. A first REST service is created. The first REST service includes the identifier and provides access to data stored in the data store for the data artefact. The first REST service is registered in a routing table.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 6 is an example definition of a virtual data object that can be used to generate a web service.

FIG. 7 is metadata describing an example web service that can be created using disclosed technologies.

FIG. 9 is example operations, such as web service requests and responses, that can be carried out using disclosed technologies.

FIG. 10 is a flowchart of operations in an example method of dynamically creating a web service and routing requests for the web service.

FIG. 11 is a flowchart of operations in an example method of generating a REST service and registering the REST service in a routing table.

DETAILED DESCRIPTION

Example 1—Overview

Figure 1:
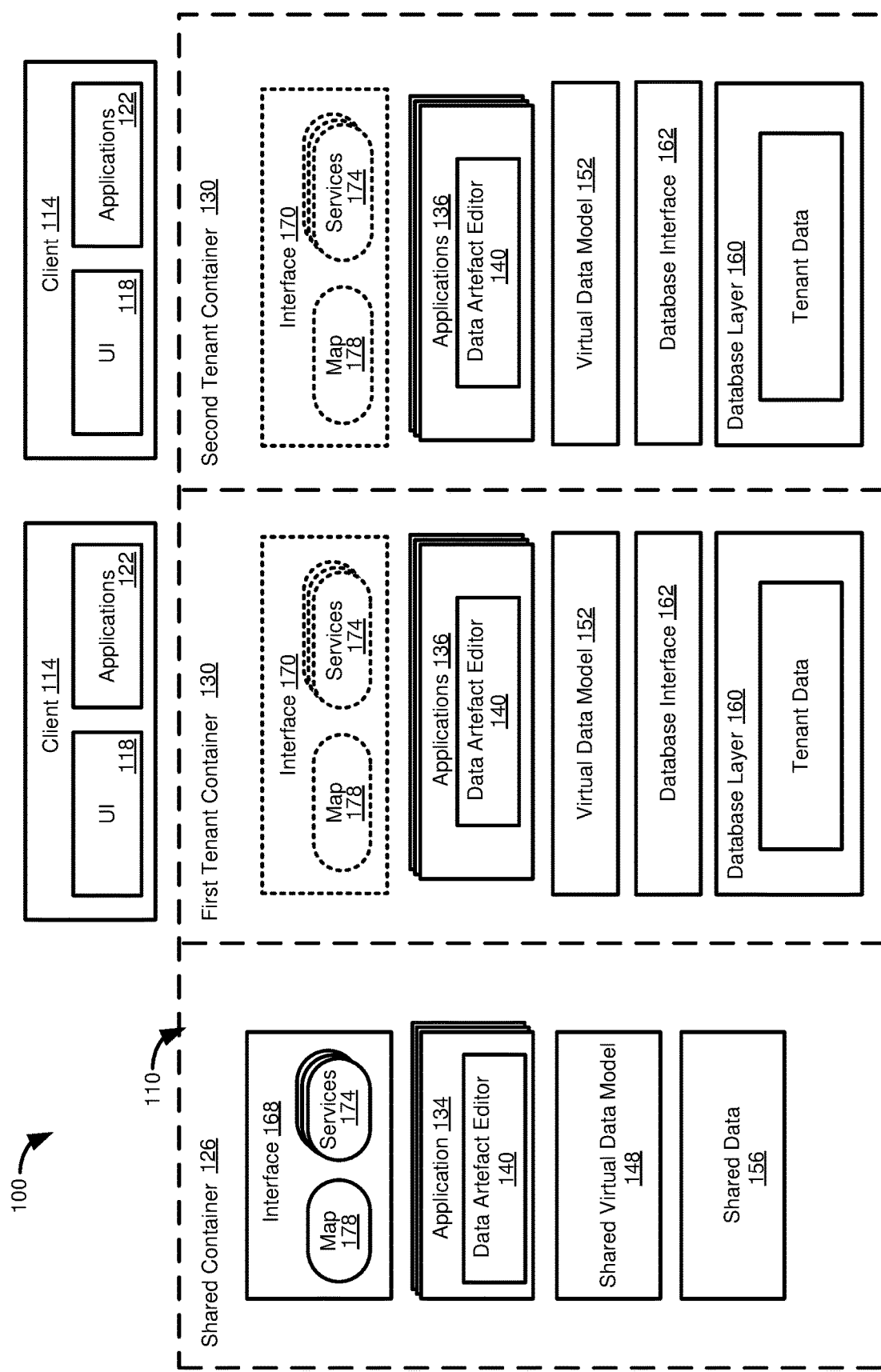
FIG. 1 is a diagram of a computing environment in which disclosed technologies can be implemented, where the computing environment includes a plurality of clients and a multitenant cloud system.

It is increasingly common to use web-based technologies, including for performing functions that might have previously been carried out on a local computing device or system. In some cases, using web-based technologies to access resources on a remote computing system can allow users to access specialized applications or greater computing resources associated with the remote computing system. For example, a remote computing system may provide machine learning functionality, including for Internet of things (IOT) applications.

IOT applications can involve massive amounts of data (e.g., generated from hundreds or thousands of sensors or other types of IOT devices), and techniques to analyze the data can be computationally expensive. A remote computing system, such as a cloud-based system, can make larger amounts of memory (e.g., RAM), secondary storage (disk space), and processing power (e.g., a GPU cluster) available to users over a network, including the Internet.

Much of the following disclosure refers to "cloud based systems" for sake of convenient presentation. However, it should be appreciated that the disclosed technologies are not limited to cloud-based systems, unless the context of the discussion clearly requires it. For example, disclosed technologies can be used with remote computing systems that might not be typically considered to be "cloud-based."

For example, cloud-based systems are often provided by an enterprise that is different from an enterprise whose users access the cloud-based system. However, disclosed technologies can be applied to computing systems associated with the same enterprise. Similarly, cloud-based resources may be more physically remote than in other types of networked environments. That is, in a networked environment, a computing device might be considered "remote" from another if they are on separate machines or if they do not share certain computing resources (e.g., a file system, name space, memory space). On the other hand, cloud-based systems may have machines that are separated by many miles from the devices which access the resources of the cloud system. So, a remote computing device, or system, as used herein refers to physically separate computing devices that typically communicate over a network, but no particular degree of "remoteness" is required.

Accessing remote resources can also be desirable because it can be more cost effective than maintaining a local system. For example, having a cloud provider handle infrastructure issues, such as making sure suitable hardware is available, can allow users greater flexibility, as they can scale up and scale down their use of cloud services as needed. Having a provider maintain and configure software can reduce costs for users, since they can maintain a smaller number of qualified personnel, and obtaining software as a service from a vendor can improve performance and availability, as the vendor may be better able to update and configure the software.

Certain types of technologies are easier to make available as cloud-based services, or otherwise on a remote basis, than others. Software, particularly complex enterprise applications, may not have been written with web-based access or other types of remote access in mind. In particular, components of a database system may rely on legacy technology. Given the number of systems that often rely on a database system, and the complexity of the associated database management system, it may be impractical to update or replace the database management system with support for remote access/cloud-based systems. Accordingly, adapting software to support remote access, and particularly for new use cases, can be challenging, and room for improvement exists.

As an example, it may be useful to provide users of a cloud based system with the ability to create data artefacts, such as artefacts (e.g., tables or views) in a database or definitions of artefacts in a virtual data model. One example of a virtual data model is the Core Data Services (CDS) software functionality provided by SAP SE, of Walldorf, Germany CDS functionality can be used to define artefacts in a database, but can also include additional semantic information that can be used by various frameworks or end user applications. In addition, the enhanced information provided by CDS artefacts can make the artefacts easier to work with than typical artefacts in a database management system (e.g., table or views created using data definition language (DDL) statements).

In many cases, cloud-based services are accessed using the Internet. However, software that enables, for example, web access (e.g., using the OData protocol) may not be flexible enough to adapt to changes made to database artefacts. For example, typically OData services for data artefacts are generated prior to runtime. If new data artefacts are created, they might not be available for use until and unless a router or server, or an application associated with the router or server, is restarted. However, restarting the router or server every time a data artefact is created, modified, or deleted may be impractical.

Disclosed technologies provide for dynamic creation of data access services. In particular, disclosed technologies facilitate the creation of REST (representational state transfer)-based services, such as OData (open data protocol) services, during runtime. Functionality can be provided for a user or application process to define new data artefacts, such as tables or views. These data artefacts can be instantiated in a data store, such as in a relational database. A service generator can read the data structures to create a data service. In some cases, the service generator can first convert the structure of a data artefact in a data model (e.g., in a physical database) into a definition for the artefact in a virtual data model. The service generator can generate the data access service from the artefact of the physical database or the corresponding artefact in the virtual data model.

In order to make new data services available to users, disclosed technologies can include a router. The router can be statically registered when a server is started. However, the router can access a service map (or routing table) that can be used to resolve requests for services. As data access services are added or removed, the service map can be updated. The statically registered server can thus access up to date mappings for data services such that new data services can be used without restarting the server.

The disclosed technologies thus provide various advantages. Disclosed technologies can simplify operation of a cloud computing system by allowing new data services to be created or modified, and used, without having to restart a server. As a consequence, users are able to access new services more expediently, without disrupting the work of other users. The ability to add new services for some users without disputing others can be particularly important when the server services multiple groups, such as tenants in a multitenant cloud system.

In addition, by automating the generation of data services, new functionality can be provided to end users by less technical users. For example, key users (typically someone with an appropriate position, or permissions, and both use case, or domain, and technical knowledge, to create and modify data artefacts to be used by an organization, including other users, end users, who may not have permissions to create, modify, or remove data artefacts) can create new data artefacts for a particular use scenario. The service generator can then quickly, dynamically, create a new data service that allows those data artefacts to be used by end users.

Even as to key users, the disclosed technologies can facilitate their creation of data artefacts and data services by reducing the requisite technical knowledge. For example, rather than having to directly define data artefacts in a physical data model (e.g., using SQL DDL statements) or defining data artefacts in a virtual data model, users can create new data artefacts using simple graphical user interfaces.

Example 2—Example Multitenant Architecture

FIG. 1 illustrates an example computing environment 100 in which disclosed technologies can be implemented. The computing environment 100 generally includes a multitenant cloud system 110 and a plurality of client computing devices 114. However, as discussed in Example 1, disclosed technologies can be employed in different types of computing environments. For example, components described as being part of the multitenant cloud system 110 can instead be part of a different type of computing system (e.g., another type of remote computing system). Similarly, the cloud system 110 need not be multitenant. Although shown as having two client devices 114, the computing environment 100 can include a single client or can include more than two clients.

The clients 114 are shown as having user interfaces 118 through which a user can access services provided by the cloud system 110. Services of the cloud system 110 can also be accessed using one or more applications 122 executing on a respective client 114. Of course, the user interface 118 is typically associated with an application 122, where the application can be a web browser or a more specialized application.

The multitenant cloud system 110 includes a shared container 126 and tenant containers 130 for each of the client devices 114. In some cases, multiple client devices 114 may access a given tenant container 130 (e.g., multiple users of the same enterprise may access a tenant container for that enterprise). In some cases, a multitenant cloud system 110 can omit the shared container 126. When the cloud system 110 (or other type of remote system) is not multitenant, the tenant containers 130 can be omitted.

The shared container 126 can include one or more applications 134 that can be used by one or more of the tenant containers 130. That is, in some cases, computing resources can be used more efficiently by providing a shared instance of an application 134 than providing applications on individual tenant containers 130. In other scenarios, tenant containers 130 can be provided with their own application instances 136. Combinations are possible, such as having some applications for a given tenant container 130 being provided as shared applications 134 and other applications being provided as tenant-specific instances of one or more applications 136.

In addition, in some cases, applications can be associated with base functionality and extended functionality (e.g., plugins or other types of extension, including extensions as implemented in software provided by SAP SE, of Walldorf Germany, such as applications implemented in the S/4 HANA or SAP Cloud Platform products of SAP SE). A base application and its extension may be located on the same container of the multitenant cloud platform 110, or can be located on different containers. For example, a base application can be located in the shared container 126 and an extension can be located in a tenant container 130, or vice versa.

One of the applications 134 (or 136) can be a data artefact editor 140. The data artefact editor 140 can be used to create, modify, or delete data artefacts, including data artefacts that can be used by the applications 134, 136, or an application 122 of a client computing device 114. Data artefacts edited using data artefact editor 140 can correspond to data artefacts in a virtual data model, a physical data model, or both. In some cases, data artefacts created using the data artefact editor 140 can be created directly in a virtual data model or a physical data model—such as by creating a CDS artefact (e.g., entity or view) in a virtual data model or creating DDL statements that can be used to define a database artefact (e.g., table or view) in a physical data model.

In other cases, the data artefact editor 140 can be used to define a data artefact in another format or representation, and that format or representation can be translated into a suitable format for a virtual or physical data model. For example, a data artefact can be defined in a markup language such as XML, or can be defined in an interchange format such as JSON (JavaScript Object Notation) or the CSN (Core Schema Notation) as used in products of SAP SE, of Walldorf, Germany. These representations can then be converted to data artefacts in a virtual or physical data model.

Data and data models stored in the multitenant cloud system 110 can be stored in the shared container 126, in tenant containers 130, or in a combination thereof. For example, some data artefacts and corresponding data can be common to all, or at least multiple, tenants, and therefore can be stored in a shared virtual data model 148 and a shared data store 156 (which can include a shared physical data model, not shown). Tenant specific data artefacts and corresponding data can be stored in tenant-specific virtual data models 152 and tenant specific data stores 160 (which can include tenant-specific physical data models).

The tenant containers 130 can include respective database interfaces 162. The database interfaces 162 can mediate access to the shared data 156 of the shared container 126 or tenant-specific data of a data store 160. A database interface 162 can include functionality that determines how particular requests for database operations should be carried out, including determining whether requested data is located in the shared container 126, a tenant container 130, or both. Even if a request for database operations includes accessing at least some of the shared data 156, all or a portion of results may be designated to be stored in a tenant-specific data store 160.

The clients 114 (e.g., using the user interface 118 or an application 122) can access the data artefact 140 editor of the shared container 126 or the tenant containers 130 to create, modify, and delete data artefacts. As discussed above, typically, actions taken with respect to the definition of data artefacts are carried out by a key user. When another user, such as an end user, wishes to take action regarding data associated with a data artefact, they can do so by accessing an interface 168 of the shared container 126 or an interface 170 of a respective tenant container 130. An interface can include one or more services 174, which can be web services. In particular, the services 174 can be web services implemented using REST principles, such as using an OData service.

In order to direct a request by a client 114 to the appropriate service 174, an interface 168, 170 can include a map 178 (or routing table). In particular, the map 178 can be used by the interface 168, 170 to route requests to the appropriate service 174, such as based on a URI requested by a client 114. The interfaces 168, 170 can be statically registered with a server of the multitenant cloud system 110, but the map 178 can be updated dynamically.

Accordingly, new services 174 can be added during runtime, allowing access to newly created or modified data artefacts.

Figure 2:
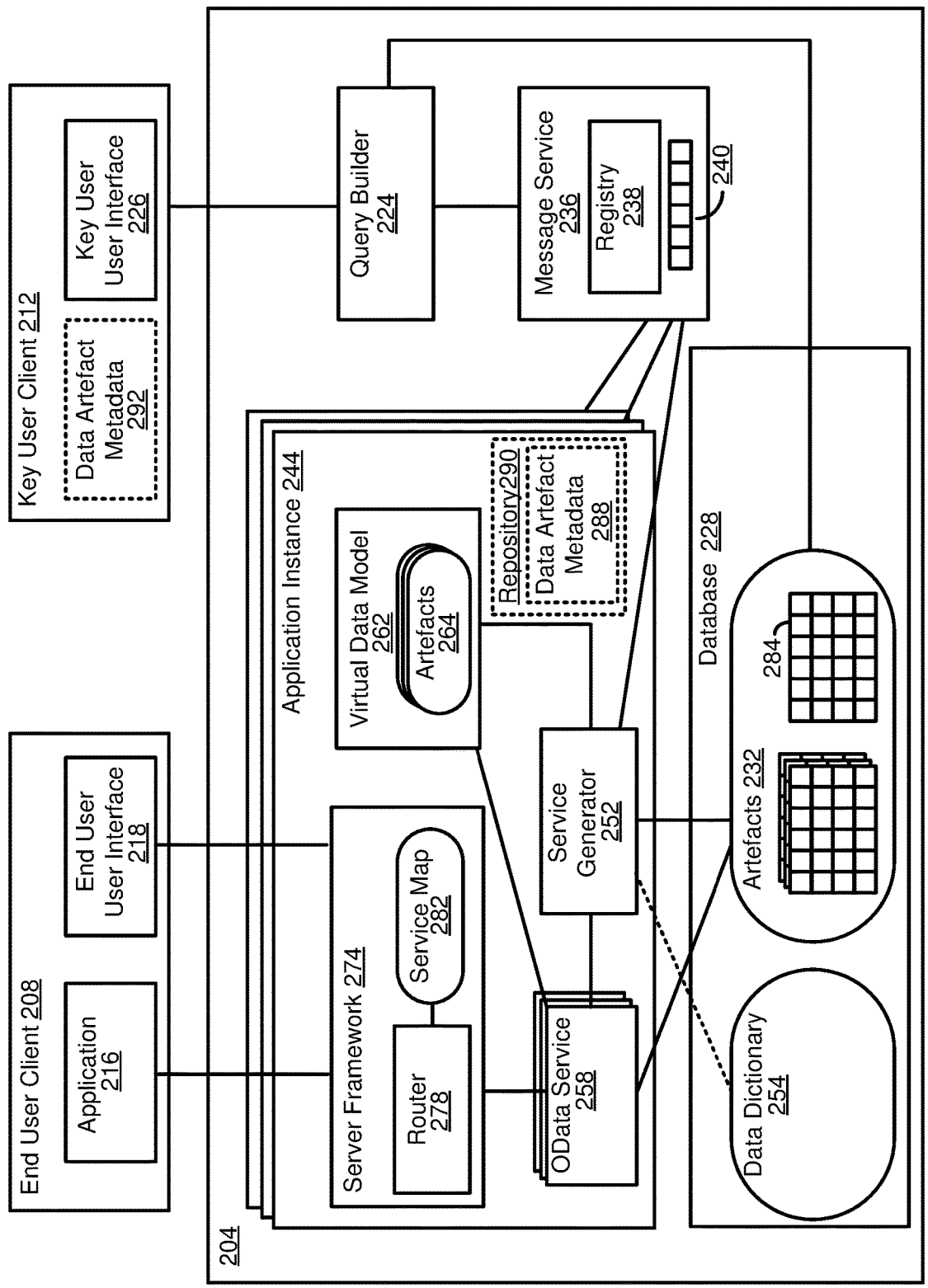
FIG. 2 is a diagram of a computing environment in which disclosed technologies can be implemented, where the computing environment includes a service generator that can create web services and register them with a service map for use by a router in routing requests received from an end user client.

Example 3—Example Architecture with Service Generator and Service Map for Dynamic Creation and Use of Web Services FIG. 2 illustrates another computing architecture 200 in which disclosed technologies can be implemented. The computing architecture 200 can represent a particular implementation of the computing architecture 100 of FIG. 1. FIG. 2 illustrates a plurality of clients, with a client 208 representing an end user client computing device and a client 212 representing a key user computing device. The end user client 208 can include one or more applications 216 or a user interface 218. The one or more applications 216 or user interface 218 can be implemented as described for the applications 122 and user interface 118 of a client 114 of FIG. 1.

The end user clients 208 are configured to support requests for database operations to be performed on data artefacts (e.g., tables or views) associated with a provider system 204. In some cases, the provider system 204 can be a cloud-based system, including the multitenant cloud system 110. Depending on the implementation, components described as being part of the provider system 204 can be implemented by one or both of the shared container 126 or a tenant container 130 of the multitenant cloud system 110.

The key user client 212 can access a query builder tool 224 of the provider system 204 using a user interface 226 of the key user client. The query builder tool 224 can correspond to the data artefact editor 140 of FIG. 1. In a particular example, the query builder tool 224 can be the Query Modeler software for use with the SAP Leonardo IoT platform, both of SAP SE, of Walldorf, Germany.

The query builder tool 224 can allow a user to create new data artefacts, and to manage existing data artefacts, such as to modify the properties of a data artefact or to delete a data artefact. As an example, a user can create a new data artefact, give the data artefact a name, or assign attributes or fields to the data artefact. In a particular use case where the query builder tool 224 is used for Internet of things applications, a user can create a table that represents sensor data. The table can be defined to include attributes corresponding to facts (e.g., readings taken by a sensor, or mathematical manipulations of such readings, including aggregations) or dimensions (e.g., data describing various properties of a sensor or sensor data).

When a change to a data artefact is committed, appropriate instructions can be sent by the query builder tool 224 to a database 228 to make corresponding changes to an artefact 232 of the database. In the case of a new database artefact 232, the query builder tool 224 can send appropriate DDL instructions to the database 228 to generate the data artefact, such as a table or view. In the case of a modified database artefact 232, the query builder tool 224 can send appropriate instructions to the database 228, such as DDL statements to add or drop one or more columns. While in some cases the query builder tool 224 sends instructions that can be directly executed by the database 228, in other cases the query builder tool 224 can, for example, call methods of an interface provided by the database to effectuate changes. Or, a representation of the database artefact can be sent from the query builder tool 224 to the database 228 and the database can generate suitable instructions for creating a corresponding database artefact 232.

Actions taken using the query builder tool 224 can generate messages that are pushed to a queue 240 of a message service 236. The message service 236 can notify one or more applications instances 244 (which can be instances of the same application, can be instances of different applications, or a combination thereof) that new or updated (including deleted) data artefacts are available. In some cases, the message service 236 maintains a registry 238 that associates particular data models (e.g., a data model associated with a particular data artefact being added or modified using the query builder tool 224). When a change notification (e.g., for an added, modified, or deleted data artefact) is received by the message service 236, the message service can consult the registry and notify the appropriate application layers 244. In other cases, the application instances 244 to be notified can be included in a message sent by the query builder tool 224 to the message service 236. Although various messaging technologies can be used, RabbitMQ (Pivotal Software, Inc. of San Francisco, Calif.) can be used as the message service 236.

A message provided by the query builder tool 224 can include less than all information sent by the query builder tool 224 to the database 228. As will be described, in some implementations, a data service for use by an end user client 208 can be created by inspecting data artefacts in the database 228. So, it may only be necessary for the message service 236 to have information sufficient to determine where messages should be sent (e.g., by including the receivers in a request to the message service or by consulting the registry 238 maintained by the message service) and an identifier for a particular data artefact that is being added, updated, or deleted. However, messages can include other information, such as an indicator of a change type (e.g., addition, modification, deletion), a priority for the message, or a priority to be used by the receiver for prioritizing processing of the message.

The process of generating a service can be carried out by a service generator 252. The service generator 252 can read definitions of data artefacts of the database 228, such as by consulting a data dictionary 254 (or information schema). For example, the service generator 252 can determine attributes associated with a data artefact 232, including a name of the attribute, a data type (e.g., integer, string) for the attribute, or whether the attribute is a key attribute (i.e., used as, or as part of, a primary key). Optionally, the service generator 252 can read other information from the data dictionary 254, such as the definition of a view (which in turn can be used to determine attributes of tables associated with the view), and relationships (e.g., foreign key relationships) with other data artefacts 232. In a further implementation, the service generator 252 can read information for database artefacts 232 described above, but by reading instantiated artefacts as opposed to reading information in the data dictionary 254.

In some cases, the service generator 252 can automatically create a data service, shown as an OData service 258, from information retrieved from the data dictionary 254 (or otherwise determined by inspecting the database 228). In other cases, the service generator 252 first generates a virtual data model artefact 264 of a virtual data model 262 corresponding to the database artefact 232. In a particular scenario, the service generator 252 generates a CDS representation of a table or view and stores the representation as a file.

In a specific implementation, an annotation, "@Odata.publish: true" indicates to the CDS framework to generate an OData service 258 from the annotated CDS definition for the virtual data model artefact 264. In another aspect, a programming command (e.g., in the ABAP language) can be executed to create an OData service 258 from a CDS file. The CDS framework provided by SAP SE, of Walldorf, Germany, includes a "service' class. The service class includes a constructor method that instantiates an OData service 258 using a CDS definition provided as an argument.

In creating a virtual data model artefact 264, the service generator 252 can convert information read for database artefacts 232 into a format used in the virtual data model artefact. Conversion can include features such as converting from data types used in the database 228 to data types used in the virtual data model 262. The service generator 252 can include in a virtual data model artefact 264 commands for creating artefacts 232 in the database (e.g., data definition language statements) or command (e.g., queries) for reading information from the database artefacts.

Although conversion of a single database artefact 228 to a virtual data model artefact 264 has been described, in some cases multiple database artefacts can be included in a single virtual data model artefact. When multiple database artefacts 228 are included in a given virtual data model artefact 264, the virtual data model artefact can specify portions of the virtual data model artefact to be included in an OData service 258. That is, in some cases all components of a virtual data model artefact 264 are included in a corresponding OData service 258, while in other cases a selected portion of the components can be indicated as to be included in the corresponding OData service. In a particular example, an indication that multiple database artefacts 232 are to be included in a single virtual data model 264/components that should be made available in the OData service 258, can be specified in a message sent to an application instance 244 from the queue 240 of the message service 236.

Requests by end user clients 208 can be handled by a server framework 274. In a specific example, the server framework 274 can be the Express framework for node.js (both available from the OpenJS Foundation of San Francisco, Calif.). When created, a given OData service 258 can be registered with a router 278. In particular, the OData service 258 is added to a service map 282 (or routing table) that is accessed by the router 278. The router 278 is typically statically registered with a server associated with a given application instance 244.

Although the router 278 is statically registered, OData services 258 can be dynamically added and removed from the service map 282 during runtime. That is, rather than having to restart the server to add or remove an OData service 258, the service map 282 can simply be updated to reflect the desired change. When the router 274 receives a service request from an end user client 208, the router 278 consults the service map 282 to determine which OData service 258 should receive the request and forwards the request to that service.

In some cases, modifications (e.g., by a key user) to a data artefact require a change to a corresponding OData service. For example, if attributes are added to, or removed from, a table, it may be necessary to update or modify the corresponding OData service 258. Typically, changes to an OData service 258 can be carried out by deleting an existing OData service 258 (which uses the older definition of the data artefact) and creating a new OData service using the current definition for the data artefact 232. In other cases, modifications to a data artefact 232 may not require a change to an OData service 258. For example, an OData service 258 may use primitive (e.g., entity data model) data types, and thus changes to the length of a data type (e.g., NVCHAR(36) versus NVCHAR(12)) used in a virtual data model or a physical data model may not require a change in the OData service.

In order to avoid unnecessarily deleting and recreating an OData service 258, the service generator 252 can compare two versions of a data artefact 232. For example, the service generator 252 can calculate a hash value from a definition of an artefact 232 of the database 228 when an OData service 258 is generated. The service generator 252 can store the hash value in association with an identifier for the corresponding data artefact 232.

When a change message is received from the message service 236, the service generator 252 can calculate a hash value for the current (i.e., updated) version of the data artefact 232 stored in the database 228. If the values are the same, the service generator 252 can determine that the existing OData service 258 can continue to be used. If the hash values differ, the service generator 252 can delete the old OData service 258 and create a new OData service. Note that comparing hash values can in some cases result in false positives—it may be indicated that a new OData service 258 should be created even though it may not be necessary. However, it is unlikely that any false negatives would be encountered (e.g. failing to create a new OData service 258 when in fact a new OData service should be created).

Calculating a hash value can be carried out using elements of a data artefact 232 that affect the nature of an OData service 258, such as using the names and data types of attributes, and indicators of whether an attribute is part of a key used for the data artefact. Suitable elements of the data artefact's definition can be concatenated and submitted to a hash function.

In other implementations, in addition to, or rather than, calculating and comparing hash value of data artefacts 232, hash values can be calculated and compared for artefacts 264 (or a collection of a plurality of artefacts, such as a collection of artefacts associated with a particular OData service 258). Calculating a hash value for an artefact 264 can be carried out using data artefacts names and attributes, as described for artefacts 232. Or, a hash value can be calculated in a different manner, such as using an entire definition of an artefact, which can include annotations. In some cases, differences in annotations between versions of an artefact 264 can provide different hash values, resulting in the creation of a new OData service 258, even though the annotation change might not affect the operation of the existing OData service.

In some aspects, annotations can be automatically added to an artefact 264, or to an OData service 258. Annotations can include those that affect who can access the OData service 258 (e.g., restricting access to end users with appropriate privileges), can indicate display properties for data associated with an artefact, or can indicate whether data associated with the artefact may be subject to data protection or privacy restrictions.

Typically, information associated with annotations is not maintained in the database 228 as part of an artefact 232. When an artefact is being generated, the service generator 252 can cross reference the artefact 232, or components of the artefact (e.g., particular attributes) with data sources that contain metadata for a data artefact (or element thereof). In some cases, data artefact metadata can be stored in the database 228, such as in a table 284. The table 284 can, for example, include a list of tables or attributes that are associated with data privacy or protection restrictions. In other cases, data artefact metadata 288 can be maintained in a repository 290 for an application instance 244, or can be maintained in a repository 292 of a client, such as the key user client 212.

Example 4—Example User Interfaces for Defining Data Artefacts

Figure 3:
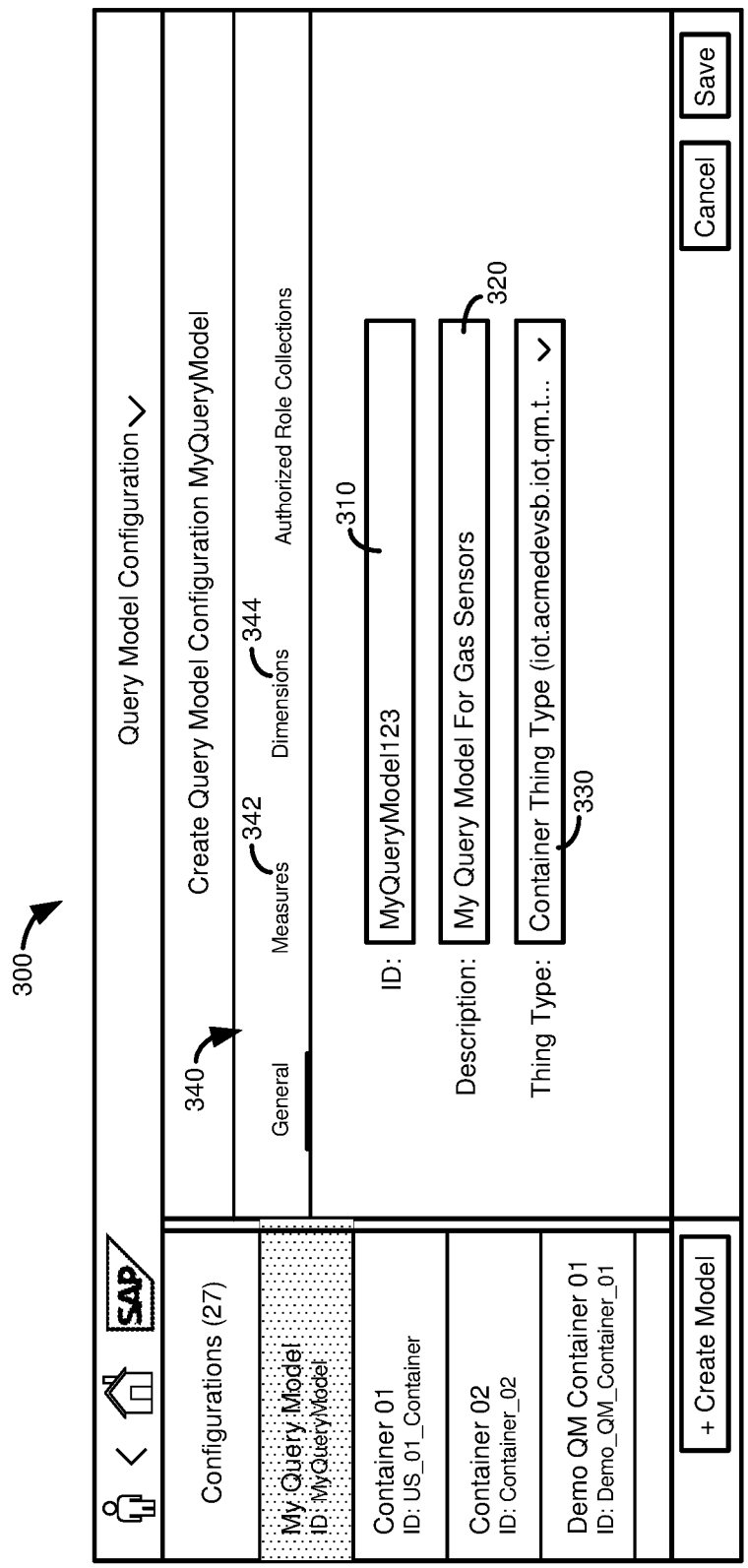
FIGS. 3-5 are example user interface screens through which users can define data artefacts for which a web service will be generated.
Figure 4:
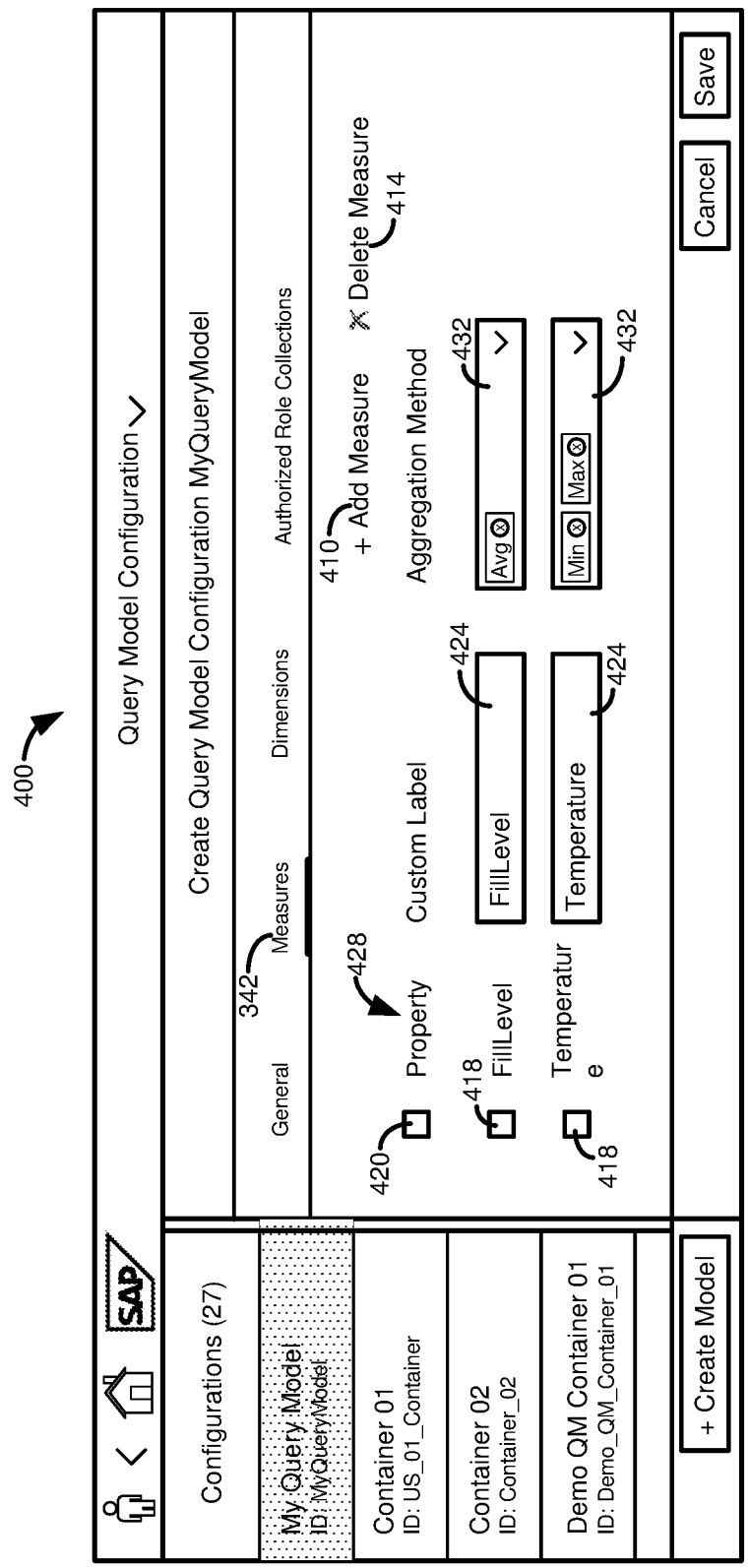
Figure 5:
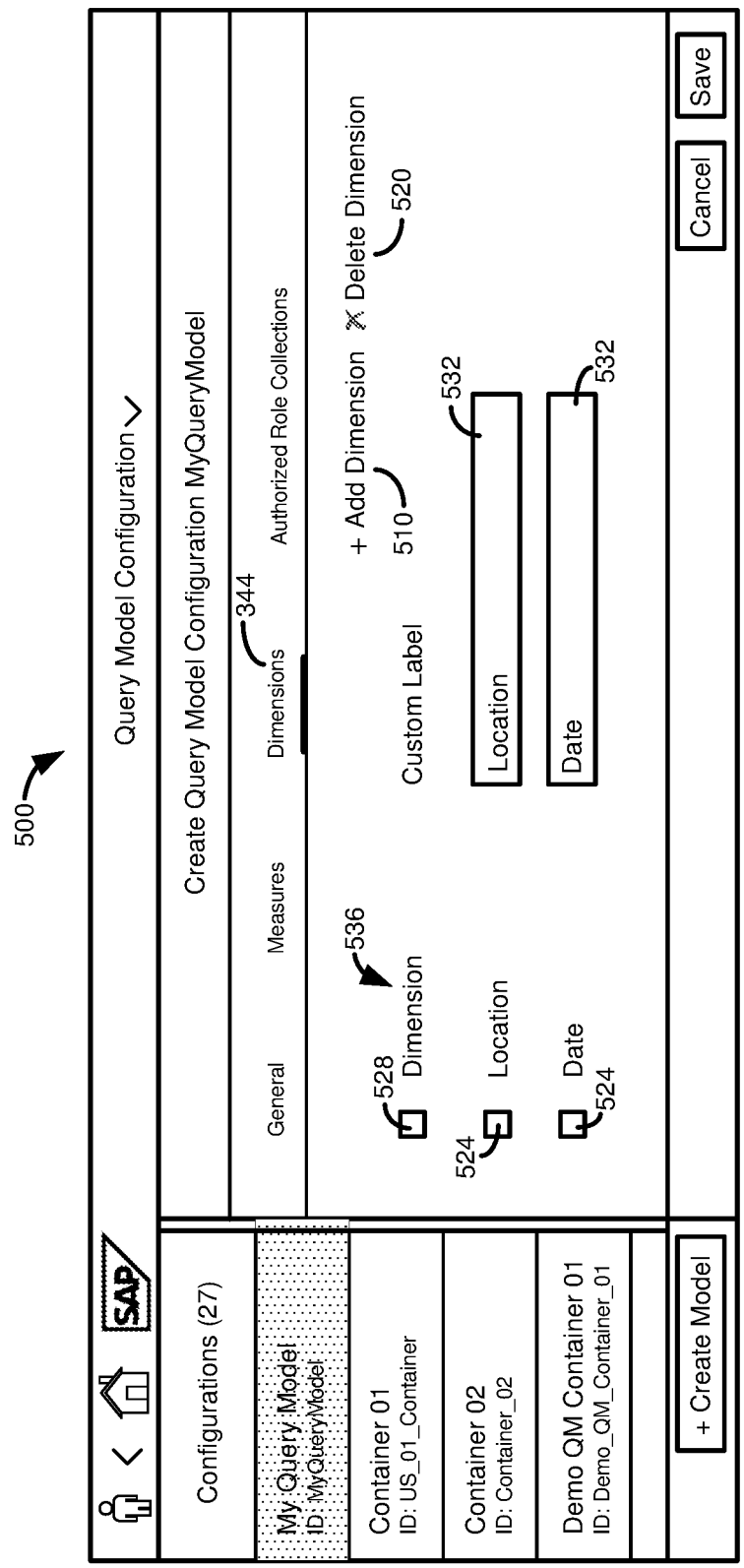

FIGS. 3-5 present a series of user interface screens 300, 400, 500 that illustrate how a user, such as a key user, can define or modify data artefacts that can be accessed by data services generated according to disclosed technologies. In particular, the user interface screens 300, 400, 500 can represent screens provided by the query builder 224 of FIG. 2.

The user interface screen 300 of FIG. 3 allows a user to define a new data artefact. A user can assign an identifier to the data artefact (or a collection of data artefacts) using an ID field 310. In some cases, the value in the ID field 310 represents the name of the artefact as stored in a database. It can be beneficial to provide a description for the data artefact (or collection) in a description field 320. For example, the types of values that can be used in the ID field 310 can be limited, such as based on naming constraints of a database system. Values entered in the description field 320 can be more meaningful to users.

In at least some cases, the value in the description field 320 can be stored in a database and made available for end users (e.g., a corresponding OData service can make the value in the description field 320 available to end users). However, the value in the description field 320 need not be provided to end users, or can be provided to end users in another manner. For example, an application made available to end users can maintain an association between available data artefacts and descriptions (e.g., in a schema or catalog accessible to the application).

In at least some cases, a user may be able to assign a type to the data artefact being created, such as using a type field 330. As shown, the field 330 can be associated with a drop down menu that allows users to select from available types. Assigning a type to a data artefact can specify a particular base definition that will be used for the data artefact, or a category to which the data artefact will be assigned. Assigning a category to the data artefact can be useful in cases where applications are configured to perform particular types of processing for particular types or categories of data artefacts. In the context of Internet of things analyses, the type in the field 330 can represent a particular type of sensor (or other IOT device) or a particular asset or component that is associated with a particular sensor.

The user interface screen 300 provides navigation options 340 for setting other properties of the data artefact. In particular, the navigation options include an option 342 for defining measures for the data artefact and an option 344 for defining dimensions for the artefact.

The user interface screens 400, 500 of FIGS. 4 and 5 can allow a user to provide information for a data artefact or data artefact collection defined through the user interface screen of FIG. 3. In some cases, the type entered in the field 330 can be used to determine how information entered using the screens 400, 500 will be used. As will be further described, the screen 400 can allow a user to enter measures, and the screen 500 can be used to enter dimensions. The type in the field 330 can be used to determine data artefacts (e.g., tables) used to store the measures and dimensions, as well as defining relationships between the tables (e.g., foreign key relationships, or defining tables as a star or snowflake schema).

The user interface screen 400 of FIG. 4 allows a user to define measures for a data artefact, and can be presented to a user upon selection of the navigation option 342. A user interface control 410 allows a user to add a new measure to the data artefact, and a user interface control 414 allows a user to delete one more measure selected using check boxes 418, all of which can be selected using a check box 420 (e.g., a "select all" control).

For each measure, a user can create a label, or name, for the property in a field 424. The value entered in the name field 424 is also displayed in a column 428. Measures can be aggregated, or extracted from source data, using various techniques (e.g., average, minimum or maximum), which techniques can be specified in a field 432. Entering an aggregation method in a field 432 can be useful in scenarios such as Internet of things applications, which can involve large amounts of data. It may be impractical, or at least unnecessary, to store or make available all data received from IOT devices. Aggregation types specified in the fields 432 can be used to process a larger data set, with the specified aggregation results being stored in one or more data artefacts specified using the screens 300, 400, 500.

The user interface screen 500 of FIG. 5 allows a user to define dimensions for a data artefact, and can be presented to a user upon selection of the navigation option 344. The user interface screen includes a control 510 that allows a user to add a new dimension, and a control 520 that allows a user to delete selected dimensions. Dimensions to be deleted can be indicated by selecting boxes 524, or all dimensions can be marked for deletion using a selection box 528. Labels for the dimensions can be added using a field 532, where the value is also shown in column 536.

Example 5—Example Virtual Data Artefact Definition

FIG. 6 is an example definition 600 for a CDS data artefact that can be used to create a data service. In particular, the definition 600 can represent the data artefact represented by the facts and dimensions shown in the user interface screens 400 and 500 of FIGS. 4 and 5.

The definition 600 includes an attribute 604 for an identifier for an instance of the data artefact and an attribute 608 for a timestamp. The timestamp attribute 608 can represent a particular time at which data associated with the instance was received. Note that the attributes 604, 608 are not among those listed in the user interface screen 500. In some cases, data artefacts can be associated with default attributes, which can be maintained by the query builder (e.g., for a particular type entered in the field 330 of FIG. 3). However, the definition is shown as also including the FillLevel attribute 612 and the Temperature attributes 616, 618, which were specified in the screen 500. The FillLevel attribute 612 has its aggregation method specified as an average, and two attributes 616, 618 have been created for the temperature attributes, corresponding to the two aggregation methods specified in the screen 500.

The definition 600 also includes information regarding dimensions of the data artefact. The dimensions include an attribute 622 for identifier of a particular instance of the data artefact, which can correspond to the identifier 604. As with the fact attributes 604, 608, the dimension attribute 622 for a data artefact can represent an attribute that is by default added to the data artefact, as it was not explicitly defined by a user in the screen 600 (but may be associated with a type entered in the field 330 of FIG. 3). However, the definition 600 also includes attributes 626, 630 for a location and a date, as entered by the user in the screen 600.

The definition 600 is shown as including additional information, in the form of annotations 634. In this case, the annotations 634 represent metadata describing the attributes 622 and 626 as potentially containing sensitive information. These annotations 634 typically are not determined directly from a corresponding database artefact. Instead, other repositories can maintain data artefacts and attributes that are associated with various properties, including a repository that provides information about confidentiality or privacy levels. When the definition 600 is being created, a service generator (e.g., the service generator 252 of FIG. 2) can access these repositories, determine properties associated with the attributes found in the database artefact, and add corresponding annotations to the definition 600.

The definition 600 includes a declaration 640 of an OData service for the database artefact. The declaration 640 includes annotations 644, 648 indicating that the entities to be made available by the OData service cannot have data inserted into them and data in the entities cannot be modified. In other words, the annotations 644, 648 indicate that end users will have read-only access to data associated with the entities included in the definition 600.

Note that while the discussion of FIGS. 3-6 at least in some cases treats the data artefacts as a single data artefact, the described data artefact can instead be implemented, at least at the database level, as multiple database artefacts. For example, the user interface screen 500 can define a data artefact (e.g., a table) specifically for facts, and the user interface screen 600 can define a specific artefact (e.g., a table) for dimensions. The definition 600 can represent a view, where both the fact table and the dimension table for a given instance of the definition are made available through a data service. Typically, in these scenarios, a service generator, such as the service generator 252 of FIG. 2, includes logic sufficient to associate related database artefacts with a single virtual data model artefact, and a single OData service. Or, in addition to causing tables to be generated in the database, the query builder can cause a view to be defined in the database, and the definition 600 can be constructed based on parsing of the view definition by the service generator.

Example 6—Example OData Service Definition

FIG. 7 is a listing 700 of metadata (in XML) for a dynamic OData service that can be generated using disclosed technologies. The listing 700 can be provided to clients (e.g., end user clients) upon request, and can provide the client with information regarding the capabilities of the OData service. In general, metadata for an OData service includes the data model (e.g., entity data model) that describes the data exposed by the OData service. Examples of data artefacts that can be exposed in metadata for an OData service include entities (e.g., records, or instances of a particular entity type), entity sets (a collection of entities, analogous to a table), and relationships. Metadata for an OData service can also include annotations, which can be used, for example, to indicate particular properties of components of the data model for the OData service, such as what operations are permitted using the service (e.g., read-only versus read/write).

The listing 700 can correspond to an OData service having the properties described with respect to FIGS. 3-6. For example, line 710 of the listing declares an entity container (e.g., a collection of all data artefacts in the data model) that includes the entity set "facts," declared at line 714, and "things," declared at line 718. The attributes, or properties, that service as the primary keys for "fact" or a "thing" are listed at lines 722, 724, respectively. A listing of all attributes for a "fact" or a "thing" are listed at lines 728, 730, respectively, and include the user-defined attributes entered via the screens 400, 500 of FIGS. 4 and 5, as well as the default attributes listed in FIG. 6. In addition to listing the names of the attributes, lines 728, 730 also provide the data types for the attributes.

As explained in the discussion of FIG. 6, the definition 600 of the CDS data artefact included annotations 644, 648 indicating that data in the data artefacts (the entity sets 714, 718) could not be added to or modified. The listing 700 includes corresponding annotations 740, 744. In addition, the listing 700 includes annotations 760 indicating that certain attributes of the entity sets include private information, which can correspond to the annotations 634 for the CDS data artefact.

Example 7—Example Service Map

Figure 8:
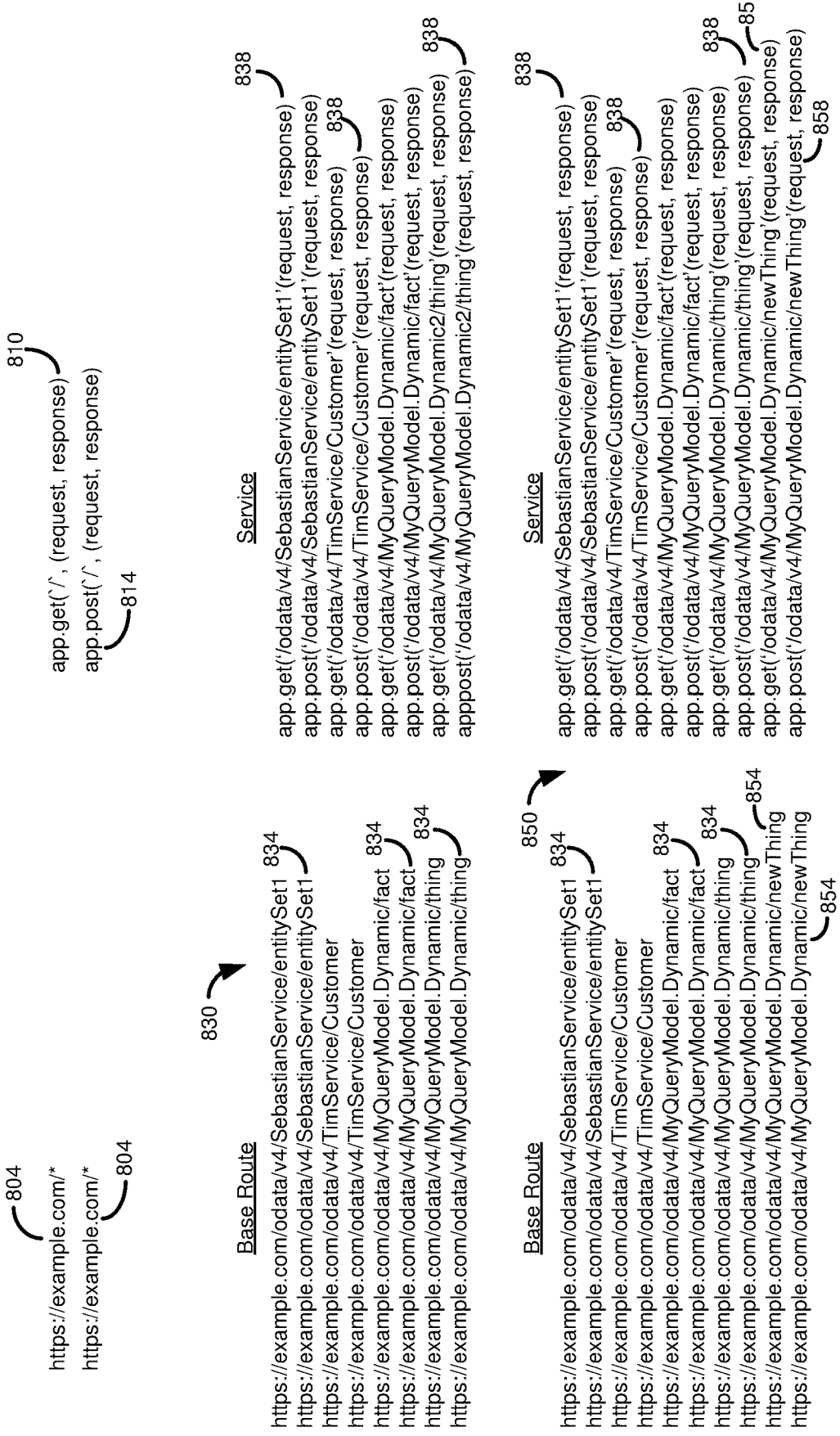
FIG. 8 is an example of a service map, or routing table, that allows web services to be dynamically added or removed during an application runtime.

FIG. 8 illustrates an example implementation of a router for dynamically routing of OData requests. The example implementation can be used as part of the router 278 and service map 282 (or routing table) of FIG. 2.

All paths associated with a given server can be registered (e.g., statically) with a dispatcher function. In at least some cases, each type of operation (e.g., get, put, post) can be registered to a dispatcher function for that operation. As shown, a generic path 804 of "example.com" is registered with a handler function 810 for a "get" operation and a handler function 814 for a "post" operation. The implementations of the handler functions 810, 814 can determine the appropriate OData service and direct the request thereto, such as using a mapping table.

As discussed, an advantage of dynamic routing is that OData services can be added, removed, and modified during runtime. That is, typically CDS data artefacts are design time artefacts that can be used, among other things, to generate corresponding OData services. Disclosed technologies allow CDS data artefacts to also function as runtime data artefacts, since the CDS artefacts can be used to generate an OData service during runtime—without restarting a server or application instance.

FIG. 8 illustrates a first mapping table 830. The mapping table includes available URIs 834 for specific data artefacts, associated with an OData service 838 generated using disclosed technologies. When an OData request is received, the server calls a routing function to determine an OData service to handle the request. The routing function can consult the mapping table 830 to determine whether an OData service 838 exists for a given path (URI 834). If so, the request is forwarded to the appropriate OData service 838. If not, an error can be returned.

FIG. 8 illustrates a second mapping table 850. The second mapping table 850 corresponds to the first mapping table, except that a new entity set, "newThing," has been added to a particular query model ("MyQueryModel", which includes the entity sets, "facts" and "thing," described in conjunction with FIGS. 5-8). The second mapping table 850 includes entries 854 that map URIs for "newThing" to a corresponding OData service 858.

Note that, although described as separate OData services, a single OData service 838 can service requests for multiple data artefacts. For example, the code 640 of FIG. 6 declares the OData service "Dynamic," which handles requests for both the "Facts" and "Things" data artefacts. In such cases, rather than including separate paths for each data artefact, the mapping tables 830, 850 can include a base path for an OData service (e.g., "dynamic"), and the OData service can process a request using the appropriate data artefact(s).

Example 8—Example OData Service Requests and Responses

FIG. 9 provides additional details on how a dynamic OData service can be implemented and used. FIG. 9 illustrates an example template 910 for a base path (e.g., to a particular data artefact, or collection of data artefacts, such as an OData service for a collection of data artefacts), and a particular example 912 of that template that requests operations using the OData service "MyQueryModel."

FIG. 9 provides an example OData "get" request template 920, and a particular example 922 of a request using that template. An example response 926 to the request 922 is also illustrated in FIG. 9.

A router useable in disclosed technologies can provide additional functions, including providing a list of available dynamic OData services. FIG. 9 illustrates both an example request 930 for a list of dynamic OData services, and an example response 932. Note that the "list" function can have a custom implementation that reads available OData services from a service map (e.g., a service map 282 of FIG. 2).

In some cases, it may be useful to update or refresh a list of available dynamic OData services. FIG. 9 illustrates an example request 940 for such a refresh.

Dynamic OData services can also be used to obtain information about a data model. For example, a user may wish to obtain information associated with annotations in the OData services (e.g., annotations, which can be data artefact metadata stored in 284, 290, 292), which can correspond to annotations in a CDS data artefact (e.g., annotations 634). FIG. 9 illustrates an example request template 950 for dimensions associated with private information, and an example response 956 to a request 952 according to the request template.

The table below provides additional examples of various HTTP methods that can be supported by dynamic OData services generated using disclosed technologies, a description of the operation, and an example URI path for accessing the relevant service. The table assumes a base resource path of: https://<query modeler url>/odata/v4/<tenant id>/<query model id>/v1.

| HTTP Method | Operation | Path |
| --- | --- | --- |
| GET | Retrieve the List of Available Services | /odata/v4/$list |
| GET | Retrieve the List of Entity Sets of the Service | /odata/v4/<tenant id>/<query model id>/v1 |
| GET | Retrieve the Metadata of the Service | /odata/v4/<tenant id>/<query model id>/v1/$metadata |
| GET | Retrieve Personal Data about Data Subjects | /odata/v4/<tenant id>/<query model id>/v1/$personal |
| GET | Retrieve a Thing | /odata/v4/<tenant id>/<query model id>/v1/Things('<thing id>') |
| GET | Retrieve the List of Things | /odata/v4/<tenant id>/<query model id>/v1/Things |
| DELETE | Delete a Thing | /odata/v4/<tenant id>/<query model id>/v1/Things('<thing id>') |
| GET | Retrieve a Fact | /odata/v4/<tenant id>/<query model id>/v1/Facts(ThingID='<thing id>',PointInTime=<Edm.DateTimeOffset>) |
| GET | Retrieve the List of Facts | /odata/v4/<tenant id>/<query model id>/v1/Facts |
| DELETE | Delete a Fact | /odata/v4/<tenant id>/<query model id>/v1/Facts(ThingID='<thing id>',PointInTime=<Edm.DateTimeOffset>) |

Example 9—Example Operations in the Dynamic Definition and Use of Web Services FIG. 10 is a flowchart of an example method 1000 of servicing data requests using a web service that is dynamically created and made available during the runtime of an application instance. The method 1000 can be implemented in the architecture 100 of FIG. 1 or the architecture 200 of FIG. 2.

At 1004, a definition of a table is received. The table includes at least one attribute. The definition of the table is stored in a database at 1008. At 1012, the definition is parsed to create a virtual definition of the table in a virtual data model. A web service is created at 1016 using the virtual definition of the table. At 1020, the web service is registered in a routing table (e.g., a service map). A request for the web service is received at 1024. At 1028, the request is routed to the web service using the routing table.

FIG. 11 is a flowchart of an example method 1100 of creating and making available a REST service. The method 1100 can be implemented in the architecture 100 of FIG. 1 or the architecture 200 of FIG. 2.

At 1104, a definition of a data model object is received. The definition includes an identifier for the data model object and at least a first data element. A data model object is generated at 1108 in a data store. The data model object corresponds to the definition of the data model object. At 1112, the identifier and the at least a first data element from the data model object are automatically read. A first REST service is created at 1116. The first REST service includes the identifier and provides access to data stored in the data store for the data artefact. At 1120, the first REST service is registered in a routing table.

Example 10—Computing Systems

Figure 12:
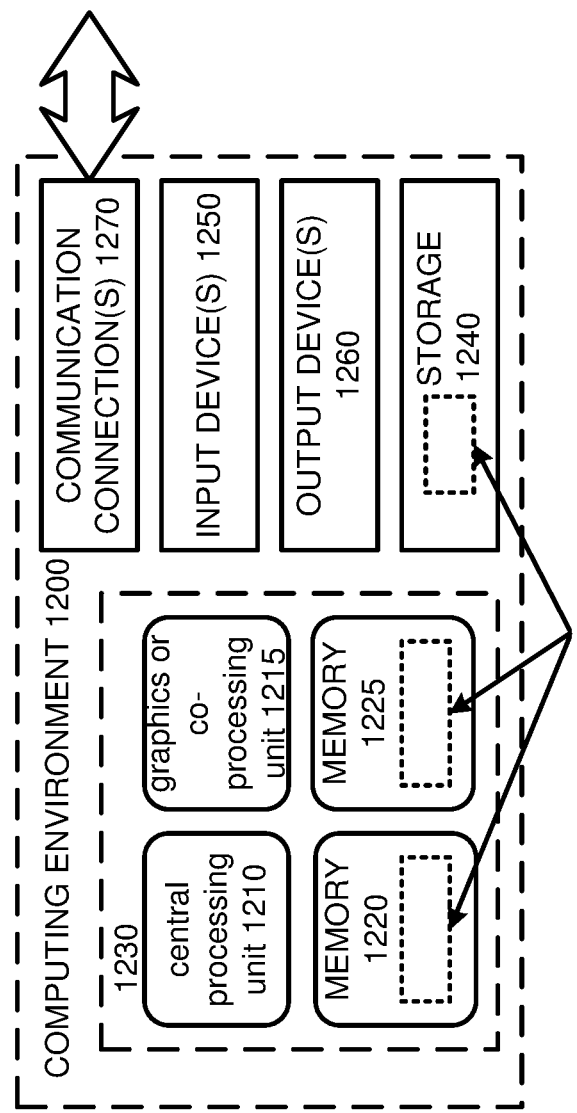
FIG. 12 is a diagram of an example computing system in which some described embodiments can be implemented.

FIG. 12 depicts a generalized example of a suitable computing system 1200 in which the described innovations may be implemented. The computing system 1200 is not intended to suggest any limitation as to scope of use or functionality of the present disclosure, as the innovations may be implemented in diverse general-purpose or special-purpose computing systems.

With reference to FIG. 12, the computing system 1200 includes one or more processing units 1210, 1215 and memory 1220, 1225. In FIG. 12, this basic configuration 1230 is included within a dashed line. The processing units 1210, 1215 execute computer-executable instructions, such as for implementing the technologies described in Examples 1-9. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s) 1210, 1215. The memory 1220, 1225 stores software 1280 implementing one or more innovations described herein, in the form of computer-executable instructions suitable for execution by the processing unit(s) 1210, 1215.

A computing system 1200 may have additional features. For example, the computing system 1200 includes storage 1240, one or more input devices 1250, one or more output devices 1260, and one or more communication connections 1270. An interconnection mechanism (not shown) such as a bus, controller, or network interconnects the components of the computing system 1200. Typically, operating system software (not shown) provides an operating environment for other software executing in the computing system 1200, and coordinates activities of the components of the computing system 1200.

The tangible storage 1240 may be removable or non-removable, and includes magnetic disks, magnetic tapes or cassettes, CD-ROMs, DVDs, or any other medium which can be used to store information in a non-transitory way, and which can be accessed within the computing system 1200. The storage 1240 stores instructions for the software 1280 implementing one or more innovations described herein.

The input device(s) 1250 may be a touch input device such as a keyboard, mouse, pen, or trackball, a voice input device, a scanning device, or another device that provides input to the computing system 1200. The output device(s) 1260 may be a display, printer, speaker, CD-writer, or another device that provides output from the computing system 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 11—Cloud Computing Environment

Figure 13:
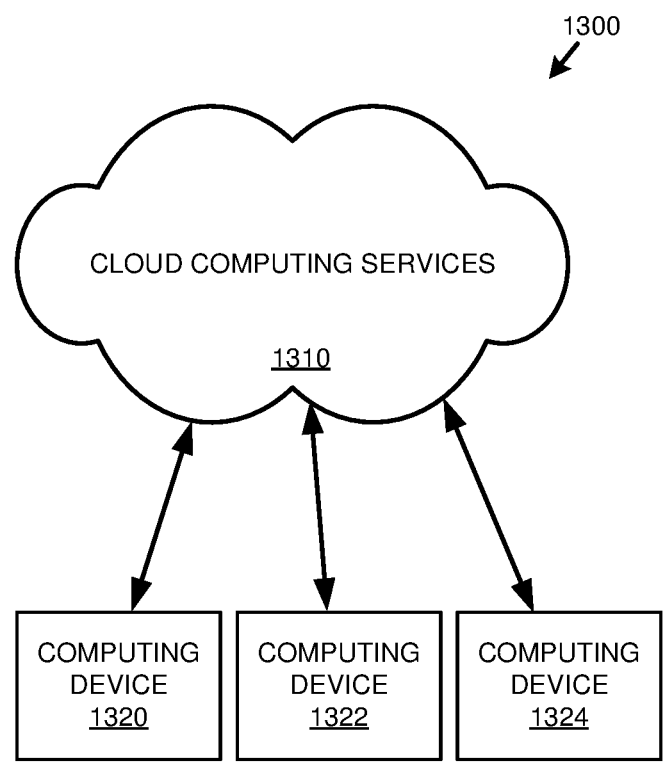
FIG. 13 is an example cloud computing environment that can be used in conjunction with the technologies described herein.

FIG. 13 depicts an example cloud computing environment 1300 in which the described technologies can be implemented. The cloud computing environment 1300 comprises cloud computing services 1310. The cloud computing services 1310 can comprise various types of cloud computing resources, such as computer servers, data storage repositories, networking resources, etc. The cloud computing services 1310 can be centrally located (e.g., provided by a data center of a business or organization) or distributed (e.g., provided by various computing resources located at different locations, such as different data centers and/or located in different cities or countries).

The cloud computing services 1310 are utilized by various types of computing devices (e.g., client computing devices), such as computing devices 1320, 1322, and 1324. For example, the computing devices (e.g., 1320, 1322, and 1324) can be computers (e.g., desktop or laptop computers), mobile devices (e.g., tablet computers or smart phones), or other types of computing devices. For example, the computing devices (e.g., 1320, 1322, and 1324) can utilize the cloud computing services 1310 to perform computing operators (e.g., data processing, data storage, and the like).

Example 12—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 12, computer-readable storage media include memory 1220 and 1225, and storage 1240. The term computer-readable storage media does not include signals and carrier waves. In addition, the term computer-readable storage media does not include communication connections (e.g., 1270).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   memory;
   one or more processing units coupled to the memory; and
   one or more computer readable storage media storing instructions that, when executed, cause the computing system to perform operations comprising:
      receiving a definition of a data model object, the definition comprising an identifier for the data model object and at least a first data element;

generating the data model object in a data store corresponding to the definition of the data model object;
receiving a request to commit the definition of the data model object;
in response to receiving the request to commit the definition of the data model object, sending a change notification to a message queue;
automatically reading the identifier and the at least a first data element from the data model object in response to receiving the change notification from the message queue;
creating a first REST service, the first REST service comprising the identifier and providing access to data stored in the data store for the data model object, wherein the first REST service is one of a plurality of REST services; and
registering the first REST service in a routing table.

2. The computing system of claim 1, the operations further comprising:
receiving over a network a request for the first REST service, the request comprising the identifier for the data model object;
from the routing table, determining that the request should be processed by the first REST service;
processing the request using the first REST service;
sending a response to the request.

3. The computing system of claim 1, the operations further comprising:
creating a virtual data model object using the identifier and the at least a first data element, wherein creating a first REST service is based at least in part on the virtual data model object.

4. The computing system of claim 3, wherein the virtual data model object is a CDS entity or a CDS view.

5. The computing system of claim 1, wherein the routing table is accessed by a statically registered router and the statically registered router accesses the routing table in response to REST requests, whereby the REST services, including the first REST service, are added to, or removed from, the routing table during runtime of an application instance.

6. The computing system of claim 1, the operations further comprising:
generating a user interface display, the user interface display providing a user interface control to create one or more data elements; and
wherein receiving a definition of a data model object comprises receiving user input creating the at least a first data element for the data model object.

7. The computing system of claim 1, the operations further comprising:
calculating a first hash result for the data model object by submitting an input to a hash function, the input comprising the at least a first data element;
receiving a modified version of the data model object;
calculating a second hash result for the modified version of the data model object;
determining that the first hash result and the second hash result are the same; and
in response to determining that the first hash result and the second hash result are the same, not deleting or modifying the first REST service.

8. The computing system of claim 1, the operations further comprising:
calculating a first hash result for the data model object by submitting an input to a hash function, the input comprising the at least a first data element;
receiving a modified version of the data model object;
calculating a second hash result for the modified version of the data model object;
determining that the first hash result and the second hash result are not the same; and
in response to determining that the first hash result and the second hash result are not the same:
deleting the first REST service;
creating a second REST service based at least in part on the modified version of the data model object;
removing the first REST service from the routing table; and
registering the second REST service in the routing table.

9. The computing system of claim 1, the operations further comprising,
receiving user input creating at least a second data element for the data model object to provide an updated definition of the data model object;
generating an updated data model object in the data store; and
creating a second REST service, the second REST service comprising the identifier, the at least a first data element, and the at least a second data element, wherein the second REST service is one of the plurality of REST services.

10. The computing system of claim 9, wherein the first REST service is an OData service.

11. The computing system of claim 1, the operations further comprising:
as part of the creating the first REST service, determining at least one property of the at least a first data element; and
including an annotation for the at least one property in the first REST service.

12. The computing system of claim 1, wherein the first REST service is not statically registered with a server that mediates requests for REST services.

13. The computing system of claim 1, wherein the routing table is associated with a router for an application instance and at least a second REST service from the plurality of REST services is registered in the routing table and used without restarting the application instance.

14. One or more computer-readable storage media comprising:
computer-executable instructions that, when executed by a computing system comprising at least one hardware processor and at least one memory coupled to the at least one hardware processor, cause the computing system to receive a definition of a table, the table comprising at least one attribute;
computer-executable instructions that, when executed, cause the computing system to store the definition of the table in a database;
computer-executable instructions that, when executed, cause the computing system to parse the definition to create a virtual definition of the table in a virtual data model;
computer-executable instructions that, when executed, cause the computing system to create a first web service using the virtual definition of the table, wherein the first web service is one of a plurality of web services, wherein each of the plurality of web services corresponds to a distinct set of one or more artefacts in the virtual data model;

computer-executable instructions that, when executed, cause the computing system to receive a modified version of the virtual data model;

computer-executable instructions that, when executed, cause the computing system to determine that the modified version of the virtual data model and the virtual data model are not the same; and computer-executable instructions that, when executed, cause the computing system to, in response to determining that the modified version of the virtual data model and the virtual data model are not the same, create a second service based at least in part on the modified version of the virtual data model.

15. The one or more computer-readable storage media of claim 14, further comprising:

computer-executable instructions that, when executed, cause the computing system to send a change notification to a message queue in response to creating or updating the virtual data model;

wherein the first web service is created in response to receiving the change notification from the message queue.

16. The one or more computer readable storage media of claim 14, further comprising:

computer-executable instructions that, when executed, cause the computing system to register the first web service in a routing table; and computer-executable instructions that, when executed, cause the computing system to route the request to the first web service using the routing table.

17. The one or more computer-readable storage media of claim 16, wherein the computable-executable instructions that cause the computing system to route the request to the first web service using the routing table are executed by a router that is statically registered with an application instance, and further comprising computer-executable instructions that, when executed, cause the computing system to dynamically add the web services to the routing table without restarting the application instance.

18. A method implemented in a computing system comprising a memory and one or more processors, the method comprising:

receiving a definition of a table, the table comprising at least one attribute;

storing the definition of the table in a database;

parsing the definition to create a virtual definition of the table in a virtual data model;

creating a first web service using the virtual definition of the table, wherein the first web service is one of a plurality of web services, wherein each of the plurality of web services corresponds to a distinct set of one or more artefacts in the virtual data model;

receiving a modified version of the virtual data model;

determining that the modified version of the virtual data model and the virtual data model are not the same; and in response to determining that the modified version of the virtual data model and the virtual data model are not the same, creating a second web service based at least in part on the modified version of the virtual data model.

19. The method of claim 18, further comprising:

sending a change notification to a message queue in response to creating or updating the virtual data model;

wherein the first web service is created in response to receiving the change notification from the message queue.

20. The method of claim 18, further comprising:

registering the first web service in a routing table; and routing the request to the first web service using the routing table;

wherein routing the request to the first web service using the routing table is executed by a router that is statically registered with an application instance, and further comprising dynamically adding the web services to the routing table without restarting the application instance.

\* \* \* \* \*